(12) United States Patent
Xu et al.

(10) Patent No.: US 9,616,587 B2
(45) Date of Patent: Apr. 11, 2017

(54) FENCE ASSEMBLY FOR A MITER SAW

(75) Inventors: Kesong Xu, Nanjing (CN); Jiang Wang, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 734 days.

(21) Appl. No.: 12/985,495

(22) Filed: Jan. 6, 2011

(65) Prior Publication Data
US 2011/0167977 A1 Jul. 14, 2011

(30) Foreign Application Priority Data

Jan. 8, 2010 (CN) .................... 2010 2 0022763 U

(51) Int. Cl.
| | | |
|---|---|---|
| B23D 47/04 | (2006.01) | |
| B27B 27/08 | (2006.01) | |
| B27B 27/10 | (2006.01) | |
| B27B 27/06 | (2006.01) | |
| B27B 27/04 | (2006.01) | |

(52) U.S. Cl.
CPC .............. *B27B 27/08* (2013.01); *B23D 47/04* (2013.01); *B27B 27/04* (2013.01); *B27B 27/06* (2013.01); *B27B 27/10* (2013.01); *Y10T 83/762* (2015.04); *Y10T 83/7647* (2015.04); *Y10T 83/7693* (2015.04); *Y10T 83/7697* (2015.04); *Y10T 83/7722* (2015.04); *Y10T 83/7772* (2015.04)

(58) Field of Classification Search
CPC ......... B27B 27/08; B27B 27/10; B27B 27/04; B27B 27/06; B23D 47/04; B23D 47/06; Y10T 83/7593; Y10T 83/7607; Y10T 83/7613; Y10T 83/762; Y10T 83/7633; Y10T 83/764; Y10T 83/7647; Y10T 83/7693; Y10T 83/7697; Y10T 83/7722; Y10T 83/7772; Y10T 83/7788; Y10T 83/8773

USPC .. 83/468.2, 468.3, 468.7, 471.2, 471.3, 490, 83/467.1, 468.1, 468.5, 468.6, 477, 486.1, 83/581; 144/286.1, 286.5, 287; 249/180; 269/278 R, 303, 304, 315, 319; 312/302, 312/303, 306

See application file for complete search history.

(56) References Cited

U.S. PATENT DOCUMENTS

| | | | | |
|---|---|---|---|---|
| 1,477,065 | A | * 12/1923 | Kuert ............................ | 249/180 |
| 3,188,161 | A | *  6/1965 | Powder ......................... | 312/306 |
| 3,302,669 | A | *  2/1967 | Edler ........................... | 83/471.3 |
| 5,060,548 | A | * 10/1991 | Sato et al. ................... | 83/471.3 |
| 5,063,805 | A | * 11/1991 | Brundage .................... | 83/468.3 |
| 5,181,448 | A |    1/1993 | Terpstra | |
| 5,855,366 | A | *  1/1999 | Chang ........................... | 269/315 |
| 5,865,079 | A |    2/1999 | Itzov | |
| 6,073,529 | A | *  6/2000 | Shibata et al. ............... | 83/468.5 |

(Continued)

*Primary Examiner* — Clark F Dexter
(74) *Attorney, Agent, or Firm* — Greenberg Traurig, LLP

(57) ABSTRACT

A leaning grid device, also referred to as a fence assembly, for a miter saw includes at least one upper leaning grid which is a movable leaning grid having an upper support surface for a work piece and at least one lower leaning grid having a lower support surface for the work piece. The lower leaning grid is also a movable leaning grid and may move between two support positions. The lower support surface and the upper support surface are in a same plane when the lower leaning grid is located at the support positions and the lower support surface and the upper support surface are in different planes when the lower leaning grid is located at a position that is between the support positions.

15 Claims, 8 Drawing Sheets

(56) References Cited

U.S. PATENT DOCUMENTS

| | | | |
|---|---|---|---|
| 6,688,350 B2* | 2/2004 | Heinlen et al. | 144/285 |
| 8,297,726 B2* | 10/2012 | Ramm et al. | 312/408 |
| 8,495,939 B2* | 7/2013 | Kani et al. | 83/490 |
| 2003/0228197 A1* | 12/2003 | Salvaryan | B23D 45/044 407/30 |
| 2008/0282862 A1* | 11/2008 | Wise | 83/468.2 |

* cited by examiner

FIF.6

FENCE ASSEMBLY FOR A MITER SAW

RELATED APPLICATION INFORMATION

This application claims the benefit of CN 201020022763.3, filed on Jan. 8, 2010, the disclosure of which is incorporated herein by reference in its entirety.

BACKGROUND

This disclosure generally relates to miter saws and, more particularly, to a leaning grid device for a miter saw.

Miter saws are currently used in various conditions for cutting a work piece. To this end, the operator may optionally move the saw blade to any of various positions or in any of various modes so as to perform a vertical cut, an angle cut, a bevel cut or a combined miter cut.

As will be appreciated, miter saws generally include a base, a worktable rotatably connected to the base, a leaning grid device or assembly (i.e., a fence assembly) for supporting a work piece, and a saw mechanism pivotally connected to the worktable. Common leaning grids generally have one of two forms, namely, a stationary leaning grid and a movable leaning grid.

The body portion and the functions of a stationary leaning grid are achieved by a single member.

A movable leaning grid generally includes a lower leaning grid fixed to the base and a movable upper leaning grid movably mounted to the lower leaning grid. The support surfaces of the lower and upper leaning grids of the movable leaning grid are in a same plane to function together as a support for the work piece. The leaning grid has a plane "A" for supporting the work piece. The plane "A" is required to be vertical to the working surface of the worktable and the plane "A" of the movable leaning grid is obtained and defined together by the finally adjusted support surfaces of the lower and upper leaning grids.

When performing a miter cut, the user may move the movable leaning grid towards the outer side of the miter saw so as to prevent the saw mechanism from interfering with the movable leaning grid. The upper leaning grid of known devices may thus be arranged as a movable leaning grid in various forms:

1. A special guide groove which is parallel to the support surfaces of the leaning grid is arranged between the upper and lower leaning grids and the interference resulting from a miter cutting operation of the miter saw may be avoided by moving the movable leaning grid along the guide groove;

2. The upper and lower leaning grids are hinged with each other where the movable leaning grid may rotate with respect to the stationary leaning grid with the axis of the rotational movement being vertical to the support surfaces of the leaning grids and the interference resulting from the miter cutting operation of the miter saw may be avoided by creating various positions after rotating the movable leaning grid;

3. The upper and lower leaning grids are hinged with each other where the upper leaning grid may rotate with regard to the stationary leaning grid with the axis of the rotational movement being vertical to the support surfaces of the leaning grids and the interference resulting from the miter cutting operation of the miter saw may be avoided by creating various positions after rotating the upper leaning grid; or 4. The upper leaning grid generally has at least two positioning posts with the lower leaning grid having a plurality of positioning holes where the directions of the axes of the posts and holes are parallel to the support surfaces and the interference resulting from the miter cutting operation of the miter saw may be avoided since the different cooperating positions of the posts with the positioning holes may create different positions of the upper leaning grid.

Since the lower leaning grid in such known devices is generally a stationary leaning grid, the miter saw still has some defects. For example, it is provided in the safety standard that the distance between the support surface of the leaning grid device and the saw blade should be as small as possible so as to prevent the work piece from flying out when cutting smaller work pieces. Considering the smaller distance between the stationary leaning grid and the saw blade which may result in the interference upon a miter cutting operation, the known leaning grid device cannot meet the requirements provided by the safety standard. In order to solve this problem, a U.S. Pat. No. 5,755,148 discloses an improved leaning grid device, which has a plate respectively added between the stationary leaning grids on two sides and the saw blade to fill the space between the stationary leaning grids and the saw blade. During miter cutting, the filled plate is removed. This solution, however, increases the number of the components and the manufacture cost, and complicates operation of the saw.

SUMMARY

The subject miter saw is intended to overcome the defects existing in the prior art by providing an improved miter saw with an improved leaning grid device, which has a simple structure and may be operated conveniently.

To this end, the subject miter saw is provided with a leaning grid device which is mounted to a tool body for supporting a work piece and which includes at least one upper leaning grid which is a movable leaning grid having an upper support surface for a work piece and at least one lower leaning grid which is also a movable leaning grid having a lower support surface for the work piece, wherein the lower leaning grid may move at least between a first support position and a second support position, and wherein the lower support surface and the upper support surface are in a same plane when the lower leaning grid is located at the first or second support position and are not in a same plane when the lower leaning grid is located at a position between the first and second support positions.

According to a preferred embodiment, the leaning grid device is mounted to a bracket by at least one connecting rod with two ends pivotally connected to the bracket and the lower leaning grid respectively.

According to another preferred embodiment, the leaning grid device is mounted to a bracket with at least two openings, and the lower leaning grid has at least one post for cooperating with the openings.

The subject miter saw may additionally include a base, a worktable, a leaning grid device (i.e., a fence assembly) for supporting a work piece, and a saw mechanism pivotally connected to the worktable, wherein the saw mechanism includes a saw blade for cutting the work piece, and the leaning grid device is the above leaning grid device for the miter saw.

With the above technical solutions, the subject miter saw may achieve the following technical effects:

(1) The lower leaning grid is movably connected to the bracket, and therefore at least two support positions may be obtained (for example, a position adjacent to the saw blade and a position far away from the saw blade), to provide the leaning grid device with a compact structure that may be used conveniently;

(2) Enough support areas may be provided in different cutting conditions; and (3) When the miter saw is in the vertical cutting mode, the leaning grid device can provide enough support area to support the work piece to be cut even if the work piece is shorter, thus it may ensure that the work piece may not fly out to thereby enhance safety.

DETAILED DESCRIPTION

Preferred embodiments of the subject miter saw will now be described in detail with reference to the accompanying drawings.

Figure 1:
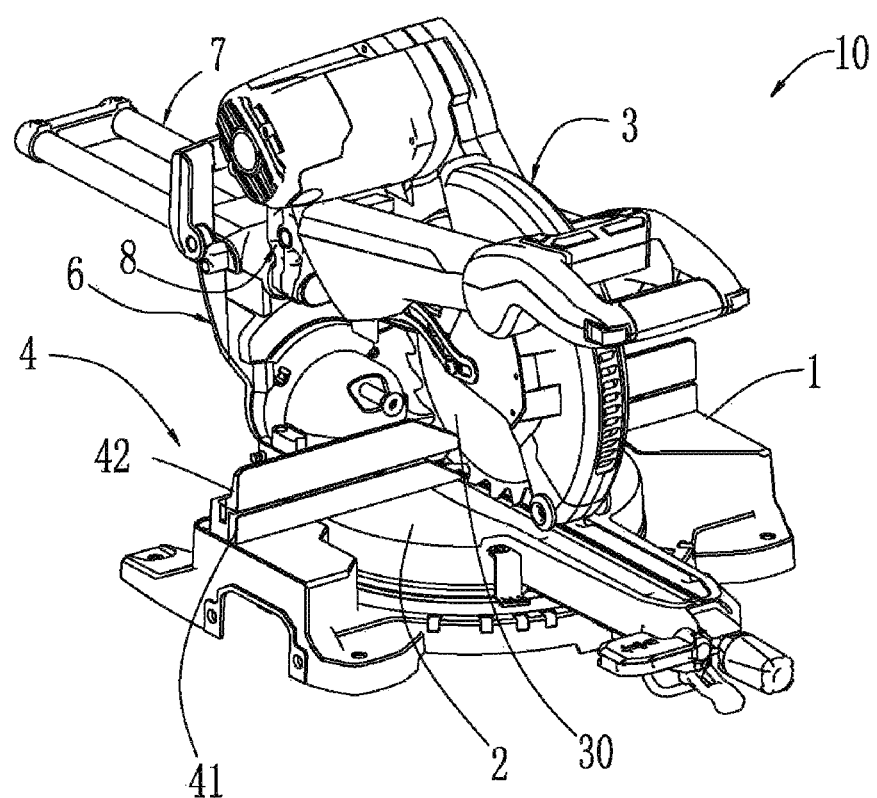
FIG. 1 is a schematic view showing an exemplary miter saw in a usable state constructed according to the description that follows.

Referring to FIG. 1, illustrated is a miter saw 10 which includes a base 1, a worktable 2 rotatably connected to the base 1, a saw mechanism 3 pivotally connected to the top of the worktable 2 by a support arm 6, a sliding rod mechanism 7 as well as a pivot 8, and a leaning grid device 4 (i.e., a fence assembly). The saw mechanism 3 includes a saw blade 30 for cutting the work piece. The work piece (not shown in the drawings) may be placed on the worktable 2, and the worktable 2 and the leaning grid device 4 can be used to support the work piece together.

As shown in FIG. 1, the miter saw 10 may be used to perform an angle cut by rotating the worktable 2 which supports the saw mechanism 3 around a vertical axis with regard to the base or to perform a bevel cut by rotating the support arm 6 around a horizontal axis with regard to the worktable 2. The structures for performing these two functions are well known to persons skilled in the art and it is therefore unnecessary to provide further detail herein.

Figure 2:
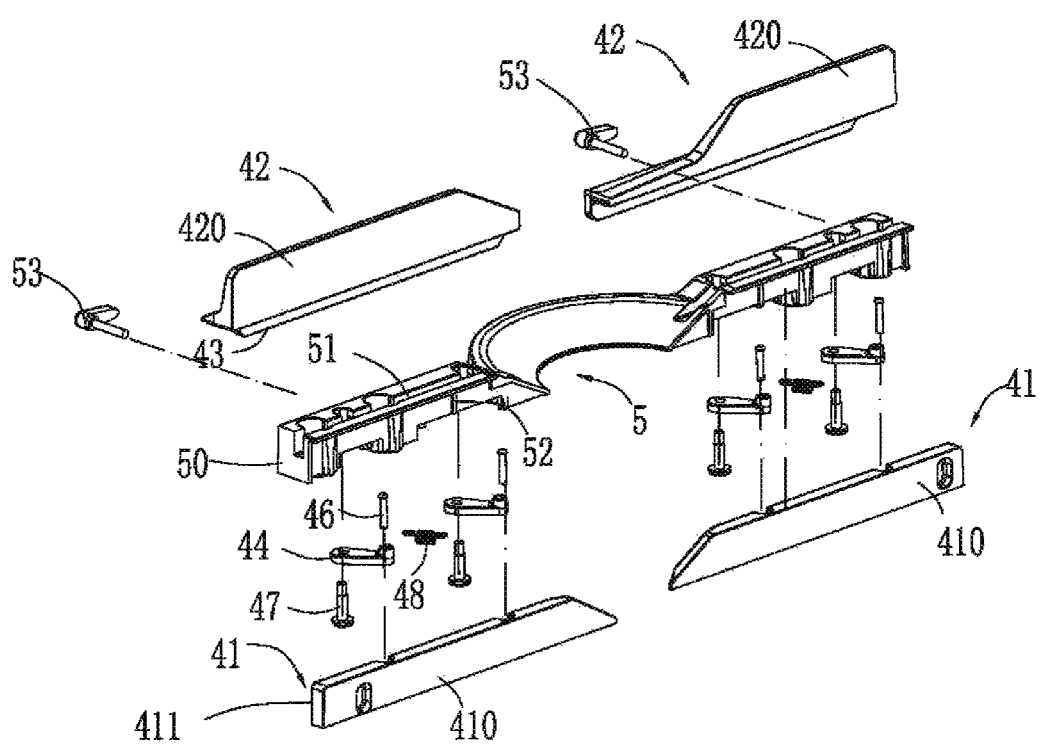
FIG. 2 is an exploded view showing an exemplary leaning grid of the miter saw according to a first embodiment thereof.

Referring to FIGS. 1-2, a first exemplary leaning grid device 4 includes a lower leaning grid 41 with a lower support surface 410 for the work piece and an upper leaning grid 42 with an upper support surface 420 for the work piece. In a usable state, the upper and lower support surface 420, 410 are in a same plane for supporting the workpiece. A bracket 5 is fixedly mounted to the base 1 for supporting the leaning grid device 4. The bracket 5 is configured to extend across the table surface of the worktable 2.

Figure 3:
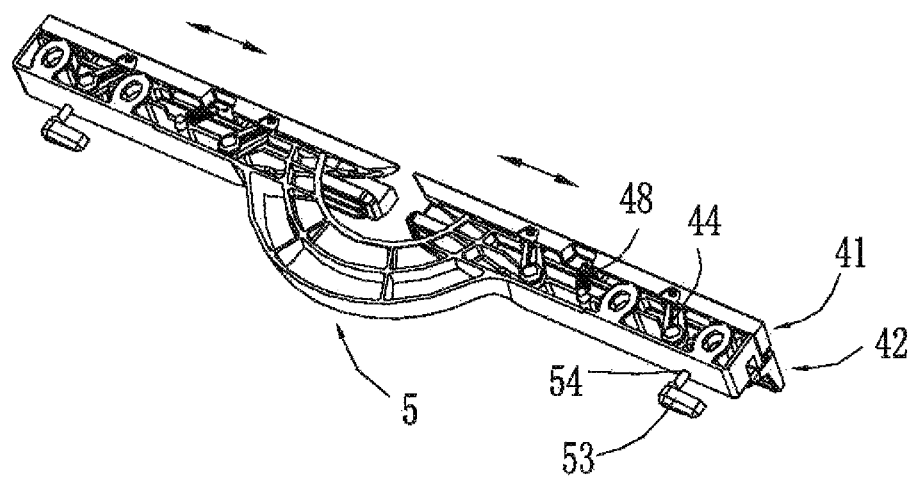
FIG. 3 is a bottom view showing the leaning grid of the miter saw in the assembled state according to the first embodiment thereof.
Figure 4:
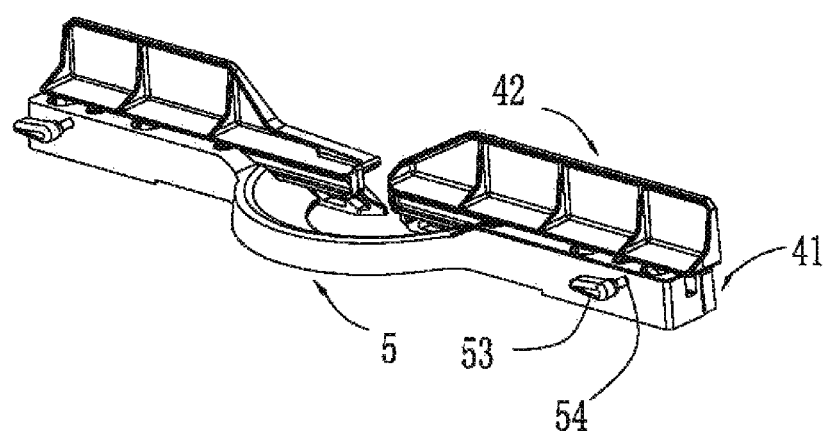
FIG. 4 is a back view showing the leaning grid of the miter saw in the assembled state according to the first embodiment thereof.

As shown in FIGS. 2-4, two symmetrical lateral rods 50 with a front surface 52 respectively are arranged on the two ends of the bracket 5. The lower leaning grid 41 has a back surface 411 parallel to the lower support surface 410 at the opposite side of the lower support surface 410 for the work piece. The leaning grid device 4 also includes a connecting rod 44 and pins 46, 47 to provide a hinge connection. The pins 46, 47 are passed through the two ends of the connecting rod 44 such that the connecting rods 44 are hinged to the bracket 5 and the lower leaning grid 41, respectively. The axes of the pins 46, 47 are parallel to each other and are parallel to the support surface 410 and the front surface 52. A spring 48 is used to pull the lower leaning grid 41 towards the bracket 5 so that the back surface 411 of the lower leaning grid 41 and the front surface 52 of the bracket 5 are kept in a closely abutted position. In order to increase the reliability and steadiness of the connection between the lower leaning grid 41 and the bracket 5 and the accuracy of the movement position of the lower leaning grid, the two connecting rods 44 are provided parallel to each other.

As shown in FIG. 3, the lower leaning grid 41, the bracket 5, and the two connecting rods 44 form a four-bar linkage with a parallelogram shape, thus, the lower leaning grid 41 may move between a first support position and a second support position (as indicated by the arrows). When the connecting rods 44 move towards the saw blade so that the back surface 411 of the lower leaning grid 41 and the front surface 52 of the bracket 5 are closely abutted, the lower leaning grid 41 is located at the first support position; whereas, when the connecting rods 44 move far away from the saw blade so that the back surface 411 of the lower leaning grid 41 and the front surface 52 of the bracket 5 are closely abutted, the lower leaning grid 41 is located at the second support position. When the lower leaning grid 41 is located at the first or second support position, the lower 410 and upper 420 support surfaces for supporting the work piece are in a same plane, and when the lower leaning grid 41 is located at a position between the first and second support positions, the lower 410 and upper 420 support surfaces for supporting the work piece are not in a same plane, that is to say, the lower 410 and upper 420 support surfaces are staggered.

The bracket 5 includes a sliding groove 51 which opens upwards, and the upper leaning grid 42 has a sliding rod 43 extending laterally at the lower end thereof correspondingly, thus the upper leaning grid 42 may slide on the bracket 5 by the cooperation of the sliding rod 43 and the sliding groove 51. The bracket 5 has a threaded hole 54, and a knob 53 passes through the threaded hole 54 and bears against the sliding rod 43 of the upper leaning grid 42, thus the upper leaning grid 42 may be fixed to the bracket 5 by screwing the knob 53.

In the presently described and illustrated embodiment, the miter saw can be used to perform bevel cutting on both sides, thus the leaning grid devices on both sides of the saw blade have the same structure. With regard to a miter saw for bevel cutting on only one side, the leaning grid device may be mounted to only one side of the saw blade in order to reduce the manufacture cost.

As shown in FIG. 1, the miter saw is in a vertical cutting mode. In this operational mode, the user may move the leaning grid device 4 towards the saw blade 30 to a position proximal to the saw blade 30. At that moment, the distance between the saw blade 30 and the support surfaces 410, 420 is the smallest, thus the work piece cannot fly out of the space between the saw blade 30 and the support surfaces 410, 420 when cutting shorter work pieces, thereby enhancing safety.

Figure 5:
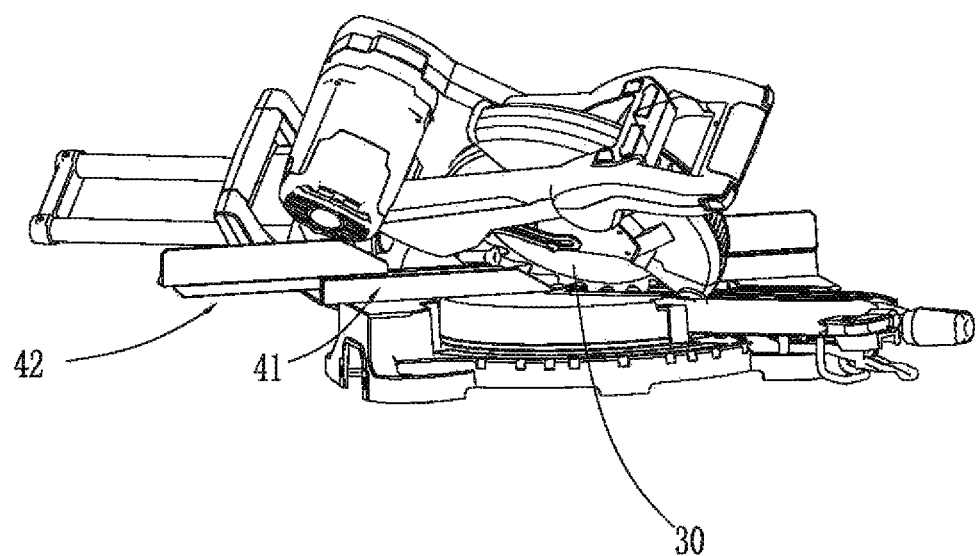
FIG. 5 is a schematic view showing the miter saw of FIG. 1 in a state usable in an extreme combined miter cutting mode.

As shown in FIG. 5, the miter saw 10 is in an extreme combined miter cutting mode. In this operational mode, the saw mechanism 3 is not only inclined towards one side to an extreme position for bevel cutting, but also rotated with regard to the base 1 to an extreme position for angle cutting, thus the saw mechanism 3 is prone to interfere with the leaning grid device 4. The user may release the knob 53 so as to move the upper leaning grid 42 outwards and screw the knob 53 when the upper leaning grid 42 is moved to the outermost side. The lower leaning grid 41 is simultaneously pulled horizontally forwards and pushed far away from the saw blade. The outwards pull operation is stopped when the lower leaning grid 41 leaves the bracket 5 to a farthest point. With the push force and the pull force of the spring, the front surface 52 of the bracket 5 and the back surface 411 of the lower leaning grid 41 are closely abutted together. At that moment, both of the lower leaning grid 41 and the upper leaning grid 42 are far away from the saw blade, thereby avoiding the interference between the saw blade 30 and the leaning grids 41, 42 caused by the extreme combined miter cutting.

The above description illustrates an exemplary first embodiment wherein the leaning grid device 4 is mounted to the base indirectly by a bracket. However, in other embodiments, the leaning grid device 4 may also be mounted to the base 1 directly, wherein the bracket 5 and the base 1 are formed integrally.

Figure 6:
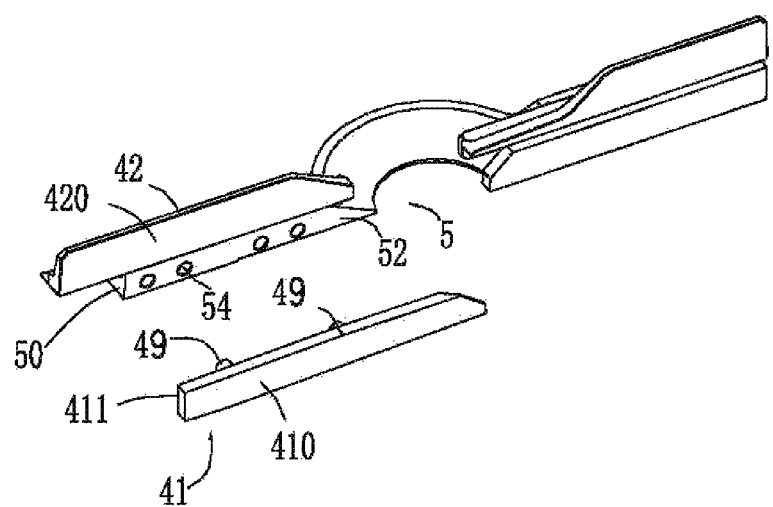
FIG. 6 is a structural view showing an exemplary leaning grid of the miter saw according to a second embodiment thereof.

Referring to FIGS. 1 and 6, similar to the first embodiment, a second embodiment of a leaning grid device 4a includes a lower leaning grid 41a with a lower support surface 410a for the work piece and an upper leaning grid 42a with an upper support surface 420a for the work piece. In a usable state, the upper and lower support surfaces 420a, 410a are in a same plane, i.e., the above mentioned plane "A" for supporting the work piece. A bracket 5a is fixedly mounted to the base 1 for supporting the leaning grid device 4a. The bracket 5a is configured to extend across the table surface of the worktable 2.

As same as the exemplary first embodiment, the upper leaning grid 42a and the bracket 5a may achieve a sliding adjustment in the horizontal direction by the cooperation of a groove and a rod.

The second, exemplary embodiment differs from the first, exemplary embodiment in that the lower leaning grid 41a is provided with at least one post 49 (preferably, more than two posts are arranged), and the corresponding bracket 5a is provided with at least two openings 54a for mating with the post 49, which may obtain at least two support positions to achieve a support function for the miter saw on different cutting positions by the staggerable cooperation of the post and the openings.

It will be appreciated by person skilled in the art that the sections of the post 49 and the openings 54a may be circular shape or non-conventional type shapes. Moreover, the openings 54a may be arranged in the lower leaning grid 41a while the post 49 for mating with the openings may be arranged in the bracket 5a.

Figure 7:
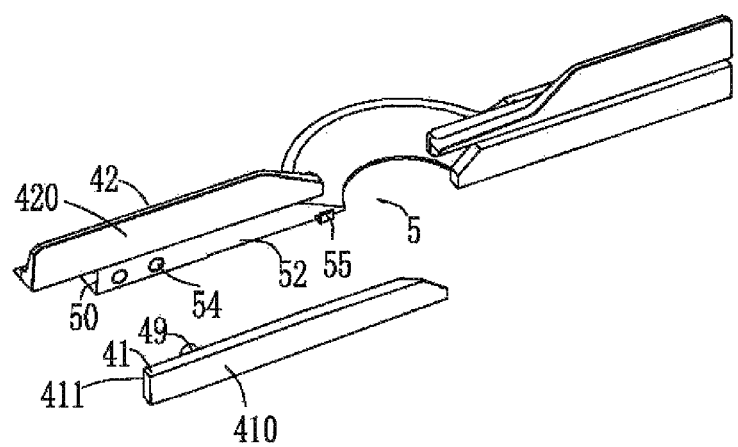
FIG. 7 is a structural view showing an exemplary leaning grid of the miter saw according to the third embodiment thereof.
Figure 8:
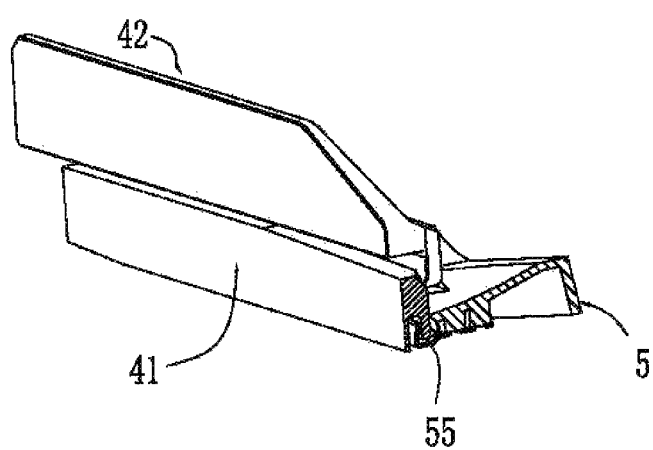
FIG. 8 is a sectional view showing the leaning grid of the miter saw according to the third embodiment thereof.

Referring to FIGS. 1, 7, and 8, similar to the exemplary first embodiment, an exemplary third embodiment of the a leaning grid device 4b includes a lower leaning grid 41b with a lower support surface 410b for the work piece and an upper leaning grid 42b with an upper support surface 420b for the work piece. In the usable state, the upper and lower support surfaces 420b, 410b are in a same plane, i.e., the above mentioned plane "A" for supporting the work piece. A bracket 5b is fixedly mounted to the base 1 for supporting the leaning grid device 4b. The bracket 5b is configured to extend across the table surface of the worktable 2.

As same as the first, exemplary embodiment, the upper leaning grid 42b and the bracket 5b may achieve a sliding adjustment in the horizontal direction by the cooperation of a groove and a rod.

As same as the second, exemplary embodiment, the lower leaning grid 41b is provided with at least one post 49b, and the corresponding bracket 5b is provided with at least two openings 54b for mating with the post 49b, which may obtain at least two support positions to achieve a support function for the miter saw on different cutting positions by the staggerable cooperation of the post and the openings.

Additionally, referring to FIGS. 7-8, the bracket 5b is provided with an elastic sheet 55. With the elastic sheet 55, the lower leaning grid 41b may approach the bracket 5b as close as possible so as to ensure that the support surface 410b of the lower leaning grid 41b is close to the required plane "A.".

While exemplary embodiments have thus been described and illustrated, it is to be understood that the miter saw and the leaning grid device so described and illustrated are not to be limited according to the structures shown in the drawings. For example, the fixing manner between the lower leaning grid and the bracket is not to be limited to the structures in the above embodiments. Rather, any changes, replacements, or modifications for the shape or position of such elements are to be regarded as falling within the protective scope of the claims set forth below.

What is claimed is:

1. A miter saw comprising:
    a base;
    a worktable for supporting a workpiece, the worktable being rotatably coupled to the base;
    a saw mechanism pivotally coupled to the worktable and including a saw blade for cutting the workpiece;
    a bracket mounted to the base; and
    a fence assembly supported by the bracket and operably coupled to and disposed above the worktable for supporting the workpiece beneath the saw blade for cutting during operation thereof, the fence assembly comprising:
       an upper fence portion operably coupled to the bracket and having an upper support surface for selectively supporting the workpiece, the upper fence portion being movable relative to the worktable; and
       a lower fence portion operably coupled to the bracket and having a lower support surface for supporting the workpiece, the lower fence portion being movable between a first support position and a second support position relative to the worktable, and
       wherein the lower support surface and the upper support surface are in a same plane with the lower support surface disposed between the upper support surface and the worktable when the lower fence portion is located at the first support position and when the lower fence portion is located at the second support position, and the lower support surface and the upper support surface are in different parallel planes when the lower fence portion is located at a position that is between the first and second support positions.

2. A miter saw according to claim 1, wherein the fence assembly comprises at least one connecting rod and a first end of the connecting rod is pivotally connected to the bracket and a second end of the connecting rod is pivotally coupled to the lower fence portion.

3. A miter saw according to claim 2, wherein the at least one connecting rod comprises two connecting rods and wherein the two connecting rods are parallel to each other.

4. A miter saw according to claim 2, further comprising a spring having a first end connected to the bracket and a second end connected to the lower fence portion.

5. A miter saw according to claim 1, wherein the bracket comprises at least two openings and the lower fence portion is provided with at least one post for mating with the openings of the bracket.

6. A miter saw according to claim 5, wherein the bracket further comprises an elastic sheet mounted to the bracket for biasing the lower fence portion towards the bracket.

7. A miter saw according to claim 1, wherein the bracket is fixedly connected to the base of the miter saw.

8. A miter saw according to claim 1, wherein the bracket is integrally formed as a part of the base of the miter saw.

9. A miter saw, comprising:
   a base;
   a worktable rotatably connected to the base;
   a bracket fixedly mounted to the base;
   a fence supported on the bracket above the worktable and configured for supporting a workpiece; and
   a saw mechanism pivotally connected to the worktable and including a saw blade for cutting the workpiece supported on the worktable and against the fence;
   wherein the fence comprises:
      an upper fence portion movable relative to the worktable and having an upper support surface for supporting the workpiece; and
      a lower fence portion movable relative to the worktable and having a lower support surface for supporting the workpiece in cooperation with the upper fence portion,
   wherein the lower fence portion is moveable between a first support position and a second support position, and the lower support surface and the upper support surface are in a same plane with the lower support surface disposed between the upper support surface and the worktable when the lower fence portion is located at the first support position and when the lower fence portion is located at the second support position, and the lower support surface and the upper support surface are in different parallel planes when the lower fence portion is located at a position that is between the first and second support positions.

10. The miter saw according to claim 9, further comprising at least one connecting rod having two ends pivotally connected to the bracket and to the lower fence portion, respectively.

11. The miter saw according to claim 10, wherein the at least one connecting rod comprises two connecting rods and wherein the two connecting rods are parallel to each other.

12. The miter saw according to claim 10, comprising a spring having two ends that are connected to the bracket and to the lower fence portion, respectively.

13. The miter saw according to claim 9, wherein the bracket comprises at least two openings and the lower fence portion is provided with at least one post for mating with the openings.

14. The miter saw according to claim 13, wherein the fence comprises an elastic sheet which is mounted to the bracket for pulling the lower fence portion towards the bracket.

15. The miter saw according to claim 9, wherein the bracket is integrally formed as a part of the base.

\* \* \* \* \*